Aug. 16, 1966        E. M. PEDERSEN        3,266,115
CLAMP MEANS FOR JOINTS FORMED BETWEEN TUBES
Filed Sept. 29, 1964

INVENTOR.
EDVARD M. PEDERSEN
BY
*Fledr and Swain*
ATTORNEYS

United States Patent Office 3,266,115
Patented August 16, 1966

3,266,115
CLAMP MEANS FOR JOINTS FORMED BETWEEN TUBES
Edvard M. Pedersen, Palo Alto, Calif., assignor to Beckman Instruments, Inc., a corporation of California
Filed Sept. 29, 1964, Ser. No. 400,084
5 Claims. (Cl. 24—263)

This invention relates generally to clamp means for securing and clamping together the ends of tubes to form fluid-tight joints.

There are various types of clamp means for urging together the ends of tubular members to form fluid-tight joints. Such means have, for example, included flanges which are received by the tubing and which are secured to one another by bolts, connectors having a pair of relatively flat, longitudinally bifurcated spring-loaded members for urging the tube sections together, and by various other means. Generally, the clamping devices suggested by the prior art have been either unwieldy or have not provided clamping pressure for withstanding relatively high pressures.

It is a general object of the present invention to provide an improved clamping means.

It is another object of the present invention to provide a clamping means suitable for sealing and clamping tubes of one size to tubes of another size.

It is a further object of the present invention to provide a clamping means which can be easily mounted and dismounted and which gives a relatively even pressure to the mated tubes.

The foregoing and other objects of the invention will become more clearly apparent from the following description when taken in conjunction with the drawing.

Referring to the drawing.

Figure 1:
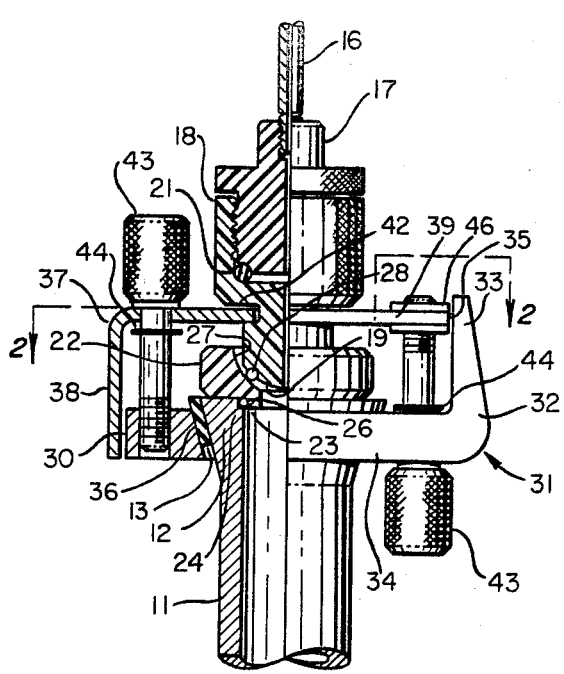
FIGURE 1 is a side elevational view, partly in section, of a joint employing a clamping device in accordance with the invention.
Figure 2:
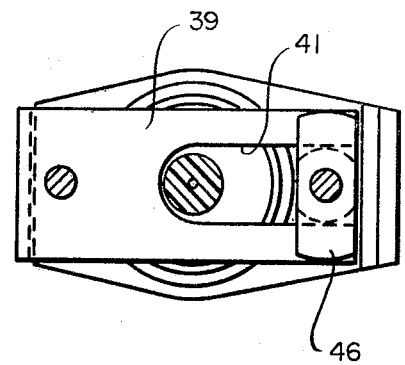
FIGURE 2 is a sectional view taken along the line 2—2 of FIGURE 1.

The joint shown in FIGURE 1 is formed between tubular elements of different diameter. The lower element 11 is of relatively large diameter. The end is formed with a conical taper 12 which forms a seat for the gasket 13. The upper tubing 16 is threadably received by an adaptor 17 which, in turn, is threaded into fitting 18 having a lower ball-shaped surface 19. An O-ring 21 may be disposed at the lower end of the adaptor 17 for providing a seal. A fitting 22 is interposed between the rounded end 19 and the end of the tubing 12. The fitting includes a shoulder 23 which cooperates with a shoulder 24 on the tubing 11 to provide a seat for an O-ring 26. The upper surface 27 of the fitting is cup-shaped to cooperate with the rounded end 19 of fitting 17. An O-ring 28 is carried in a circular groove formed in the fitting 18.

The fittings 18, 22 and tubing 11 are held in clamped relationship by the clamping assembly of the present invention, generally designated by the numeral 31. The clamping assembly includes a first angle-shaped member 32 which may be in the form of a casting and which includes a base portion 33 and a leg portion 34. An opening 36 is formed in the leg portion and is tapered to correspond generally to the taper 12. A gasket 13 is interposed between the opening and the taper 12 and provides a cushioning to accommodate the tubing 11 within the leg 34.

A second L-shaped member 37 also including a base 38 and a leg portion 39 is placed in cooperation with the member 32. The base 38 extends towards the face 30 of the leg 34 of the member 32 and the base 33 of the member 32 extends towards the face 35 of the leg 39. The leg 39 of the member 37 is slotted at 41 to receive the fitting 18. It is accommodated in the groove 42 formed therein. The two L-shaped members 32 and 37 are urged towards one another to provide the clamping or sealing force by screws 43. The screws are rotatably carried by the respective legs 34 and 39 of the two clamping means. A retaining ring 44 holds them in the member. The ends of the screws extend to and are threadably received by threaded openings formed or carried by the opposite leg. The leg 34 includes a threaded opening for receiving directly the corresponding screw 43. The leg 39 carries a slotted nut 46 which threadably receives the corresponding screw. By tightening the screws 43, the two angle members are drawn towards one another to provide the clamping force. The forces exerted are relatively uniformly distributed. The end faces 30 and 35 of the legs cooperate with the adjacent portion of the base to guide the two angle-shaped parts as they move with respect to one another and to prevent rotation of one with respect to the other.

Figure 3:
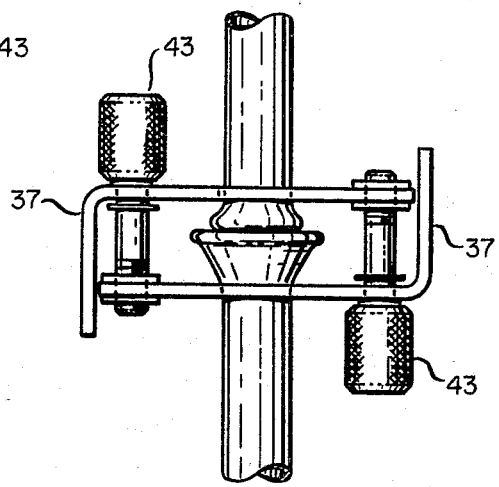
FIGURE 3 shows a ball and socket joint employing a clamping device in accordance with the invention.

In instances where relatively small tubing of the ball and socket or other type are to be joined and clamped to one another, a pair of clamps of the formed type such as clamp 37 may be used as shown in FIGURE 3. In other respects, the clamps and the parts are similar to those shown in FIGURE 1 and include like reference numerals.

In instances where relatively large tubing and high pressures are exerted, clamps of the cast type such as 31 described with respect to FIGURE 1 are employed. Again, reference numerals refer to like parts.

Figure 4:
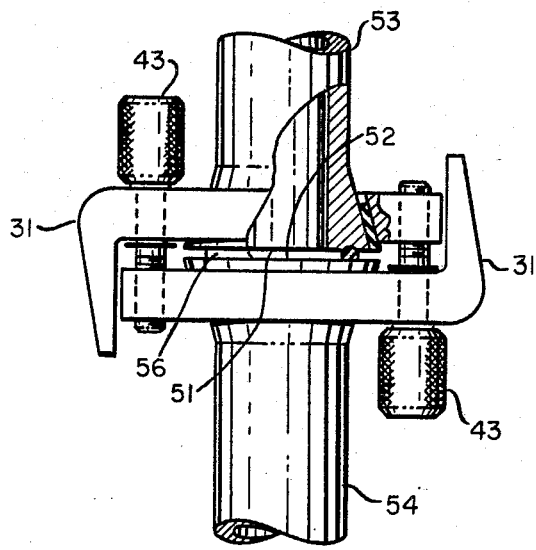
FIGURE 4 shows an abutting joint employing a clamping device in accordance with the invention.

The joint shown in FIGURE 4 is of the abutting type in which the opposed faces 51 and 52 of the tubing 53 and 54, respectively, are grooved and an O-ring 56 seated in the cooperating grooves to provide the necessary seal. Clamping pressure is obtained by rightening of the screws 43.

Thus, it is seen that there has been provided a clamp which is relatively easy to operate. The parts are simple in construction. The different types of angles are interchangeable to provide for clamping together tubing of different diameters and large or small tubing of the same diameter.

I claim:

1. A clamp means for joints formed between tubes comprising a pair of L-shaped angle members each having a leg and base, there being an opening formed in the leg of each of said angle members, said members arranged with the base of one member extending towards the other member in spaced overlapping relationship with respect to the face on the free end of the leg of the other member, and means carried by said members to urge the same towards one another to clamp the joint.

2. A clamping means as in claim 1 wherein the ends of each of said legs adjacent the base of the other member are straight and the base of the adjacent member is flat and closely disposed with respect thereto to limit rotation of one member with respect to the other.

3. A clamping means as in claim 1 wherein the last named means includes a screw rotatably carried by the leg of each angle member.

4. A clamping means as in claim 3 wherein the opening of at least one of said members opens towards the open end of the leg and receives a nut for threadably engaging the screw of the other member.

5. A clamp means for joints formed between tubes comprising a pair of angle members each having a leg and base, there being an opening formed in the leg of each of said angle members, said members arranged with the base of one member extending towards the other member in spaced relationship with respect to the free end of the leg of the other member, and means carried by said members to urge the same towards one another to clamp the joint, the free ends of each of said legs are straight and the base of the adjacent member is flat and closely disposed with respect thereto to limit rotation of one member with respect to the other.

References Cited by the Examiner

UNITED STATES PATENTS

| | | |
|---|---|---|
| 1,801,637 | 4/1931 | Nichols. |
| 2,190,220 | 2/1940 | Schilling. |
| 3,202,063 | 8/1965 | Bissell et al. ------- 285—368 X |

FOREIGN PATENTS

| | | |
|---|---|---|
| 1,179,405 | 5/1959 | France. |
| 9,105 | 1841 | Great Britain. |
| 18,808 | 10/1893 | Great Britain. |

WILLIAM FELDMAN, *Primary Examiner.*

D. GRIFFIN, *Assistant Examiner.*